United States Patent
Aoyagi et al.

(10) Patent No.: US 9,462,554 B2
(45) Date of Patent: Oct. 4, 2016

(54) MOBILE STATION THAT ADJUSTS TRANSMISSION TIMING FOR SIGNAL

(71) Applicant: NTT DOCOMO, INC., Tokyo (JP)

(72) Inventors: Kenichiro Aoyagi, Tokyo (JP); Kohei Kiyoshima, Tokyo (JP); Takahiro Takiguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/378,655

(22) PCT Filed: Mar. 13, 2013

(86) PCT No.: PCT/JP2013/057069
§ 371 (c)(1),
(2) Date: Aug. 14, 2014

(87) PCT Pub. No.: WO2013/137342
PCT Pub. Date: Sep. 19, 2013

(65) Prior Publication Data
US 2015/0024805 A1    Jan. 22, 2015

(30) Foreign Application Priority Data
Mar. 14, 2012 (JP) ................... 2012-057393

(51) Int. Cl.
*H04B 1/38* (2015.01)
*H04W 52/02* (2009.01)
(Continued)

(52) U.S. Cl.
CPC ..... *H04W 52/0254* (2013.01); *H04W 52/0216* (2013.01); *H04W 72/02* (2013.01); *H04W 72/048* (2013.01); *H04W 72/0446* (2013.01); *H04W 76/046* (2013.01); *H04W 76/068* (2013.01)

(58) Field of Classification Search
CPC ................ H04W 52/0206; H04W 76/046
USPC ........................................... 455/574
See application file for complete search history.

(56) References Cited

U.S. PATENT DOCUMENTS

2010/0142424 A1    6/2010    Huang et al.
2011/0188455 A1*   8/2011    Suzuki et al. ............ 370/328
(Continued)

OTHER PUBLICATIONS

ETSI TS 125 331 V8.1.0 (Jan. 2008) Technical Specification Universal Mobile Telecommunications System (UMTS); Radio Resource Control (RRC); Protocol specification (3GPP TS 25.331 version 8.1.0 Release 8), section 8.1.14, p. 128.*
International Search Report for corresponding International Application No. PCT/JP2013/057069, mailed Apr. 23, 2013 (2 pages).
Written Opinion for corresponding International Application No. PCT/JP2013/057069, mailed Apr. 23, 2013 (3 pages).
(Continued)

*Primary Examiner* — Thomas Lett
(74) *Attorney, Agent, or Firm* — Osha Liang LLP

(57) ABSTRACT

In order to suppress an increase in signal quantity attributed to repetition of transition to a "Preservation state" and return to an "Active state" when multiple applications are operated independently, a mobile station (UE) of the invention includes: a management unit (12) which manages a transmission timing for regular data not involving a user operation in each of multiple applications (#1 to #N); and a transmission unit (13) which transmits a "RRC CONNECTION REQUEST" to a radio access network when the mobile station (UE) transitions from a "Preservation state" to an "Active state." The transmission unit (13) is configured to adjust a transmission timing for the "RRC CONNECTION REQUEST" based on the transmission timings for the regular data not involving the user operation in the multiple applications (#1 to #N).

3 Claims, 2 Drawing Sheets

(51) Int. Cl.
*H04W 76/04* (2009.01)
*H04W 72/02* (2009.01)
*H04W 72/04* (2009.01)
*H04W 76/06* (2009.01)

(56) References Cited

U.S. PATENT DOCUMENTS

| | | |
|---|---|---|
| 2012/0051226 A1 | 3/2012 | Cai |
| 2012/0051289 A1* | 3/2012 | Dwyer et al. ................ 370/328 |
| 2012/0167118 A1* | 6/2012 | Pingili .................. G06F 1/3206 719/318 |
| 2015/0296380 A1* | 10/2015 | Twist ................ H04W 52/0251 455/411 |

OTHER PUBLICATIONS

NEC; "DISC on the UE fast dormancy controlled by the network;" 3GPP TSG-RAN2 Meeting #72, R2-106487 (revision of R2-105533); Jacksonville, FL (USA); Nov. 15-19, 2010 (2 pages).
Intel Corporation; "LTE Fast Dormancy;" 3GPP TSG-RAN WG2 Meeting #72, R2-106825; Jacksonville, FL, USA; Nov. 15-19, 2010 (7 pages).
3GPP TS 25.331 V3.8.0; "3rd Generation Partnership Project; Technical Specification Group Radio Access Network; RRC Protocol Specification (Release 1999);" Sep. 2001, Ch. 8.1.14 "Signalling Connection Release Indication" (861 pages).
Extended European Search Report in counterpart European Application No. 13 761 409.5 issued Sep. 24, 2015 (6 pages).

* cited by examiner

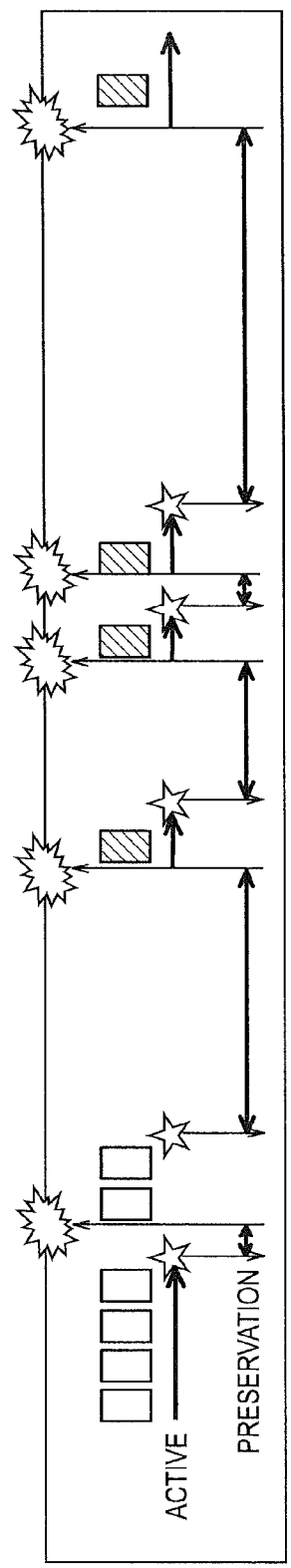

MOBILE STATION THAT ADJUSTS TRANSMISSION TIMING FOR SIGNAL

TECHNICAL FIELD

The present invention relates to a mobile station.

BACKGROUND ART

3GPP defines a "Fast Dormancy function" for the purpose of saving the battery of a mobile station UE (see Non-patent Document 1).

According to the "Fast Dormancy function," the mobile station UE is configured to, upon detection that there is no more data to be transmitted, transmit a "SIGNALLING CONNECTION RELEASE INDICATION" to a radio access network (a radio base station eNB) so that the mobile station UE can transition to a "Preservation state" immediately.

Here, the radio access network (the radio base station eNB) can control intervals at which the mobile station UE retransmits the "SIGNALLING CONNECTION RELEASE INDICATION" by notifying the mobile station UE of a value of a timer T323.

PRIOR ART DOCUMENT

Non-Patent Document

Non-patent document 1: 3GPP TS25.331 8.1.14

Problems to be Solved by the Invention

The existing "Fast Dormancy function" can be expected to produce effects of suppressing consumption of the battery and radio resources of the mobile station UE by allowing the mobile station UE to transition to the "Preservation state." On the other hand, when the mobile station UE frequently transitions to the "Preservation state" and returns to an "Active state" as in the case where the mobile station UE frequently transmits and receives small data quantities of data such as regular data in applications as shown in FIG. 3, there is a problem of an increase in signal quantity attributed to the repetition of transition and return.

When multiple applications are operated independently in the mobile station UE, in particular, an "RRC CONNECTION REQUEST" for returning to the "Active state" and the "SIGNALLING CONNECTION RELEASE INDICATION" for transitioning to the "Preservation state" are transmitted at various timings, so that there is a problem that the increase in signal quantity becomes more noticeable.

The present invention has been made in view of the aforementioned problems. An objective of the present invention is to provide a mobile station capable of suppressing an increase in signal quantity attributed to repetition of transition to a "Preservation state" and return to an "Active state" when multiple applications are operated independently.

A first feature of the present invention is summarized as a mobile station including: multiple application processing unit configured to perform processing for multiple applications, respectively; a management unit configured to manage a transmission timing for regular data not involving a user operation in each of the multiple applications; and a transmission unit configured to transmit a connection request signal to the radio access network when the mobile station transitions from a "Preservation state" to an "Active state." Here, the transmission unit is configured to adjust a transmission timing for the connection request signal based on the transmission timings for the regular data not involving the user operation in the multiple applications.

BRIEF DESCRIPTION OF THE DRAWINGS

FIG. 3 is a view for explaining problems of a conventional mobile communication system.

MODE FOR CARRYING OUT THE INVENTION

Figure 1:
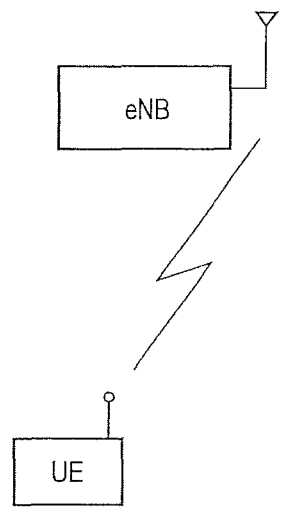
FIG. 1 is an overall configuration diagram of a mobile communication system according to a first embodiment of the present invention.

Mobile Communication System According to First Embodiment of Present Invention A mobile communication system according to a first embodiment of the present invention will be described with reference to FIG. 1 and FIG. 2.

The mobile communication system of the embodiment may be an LTE (Long Term Evolution) mobile communication system, a WCDMA (Wideband CDMA) mobile communication system, or a mobile communication system of other radio access network architecture.

While the following embodiment will describe an LTE mobile communication system as an example, the present invention is also applicable to other than the LTE mobile communication system. Here, as shown in FIG. 1, the mobile communication system of the embodiment includes a radio base station eNB and a mobile station UE.

Figure 2:
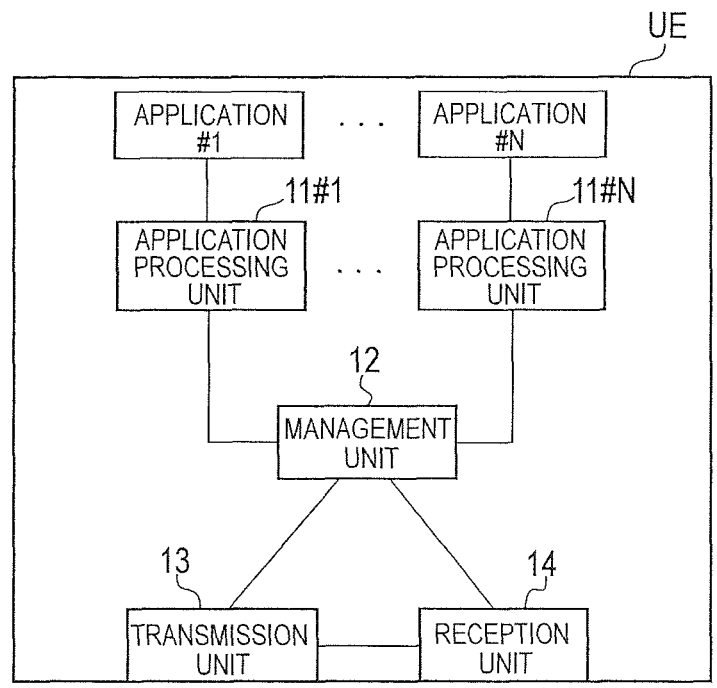
FIG. 2 is a functional block diagram of a mobile station according to the first embodiment of the present invention.

As shown in FIG. 2, the mobile station UE of the embodiment includes application processing units 11#1 to 11#N, a management unit 12, a transmission unit 13, and a reception unit 14.

The application processing units 11#1 to 11#N are configured to perform processing for multiple applications #1 to #N, respectively.

Here, the application processing units 11#1 to 11#N are configured to perform the processing for the multiple applications #1 to #N respectively and independently.

The management unit 12 is configured to manage a transmission timing for regular data not involving a user operation in each of the multiple applications #1 to #N.

Here, transmission and reception of the data not involving the user operation may be transmission and reception of regular data in an application such as a "Keep Alive signal," for example.

Meanwhile, in addition to the above-described occurrence timing, the management unit 12 may be configured to further manage a timing for activating each of the multiple applications #1 to #N, a timing when there becomes no more data to be transmitted in each of the multiple applications #1 to #N, and a timing when data involving a user operation occurs in each of the multiple applications #1 to #N.

Here, transmission and reception of the data involving the user operation may be of browsing data, for example.

The reception unit 14 is configured to receive various signals from a radio access network, namely, the radio base station eNB. The transmission unit 13 is configured to transmit various signals to the radio access network, namely, the radio base station eNB.

For example, the transmission unit 13 is configured to transmit an "RRC CONNECTION REQUEST (a connection request signal)" to the radio access network (such as the radio base station eNB) when the mobile station UE transitions from a "Preservation state" to an "Active state."

Meanwhile, when a "Fast Dormancy function" is used by the mobile station UE, the transmission unit 23 may basically be configured to transmit a "SIGNALLING CONNECTION RELEASE INDICATION" to the radio access network (the radio base station eNB) in the case of detection that there is no more data to be transmitted.

Here, the transmission unit 13 may be configured to adjust a transmission timing for the "RRC CONNECTION REQUEST" based on the transmission timings for the regular data not involving the user operation in the multiple applications #1 to #N.

For example, the transmission unit 13 may be configured to transmit one "RRC CONNECTION REQUEST" at a predetermined timing within a predetermined period instead of transmitting the "RRC CONNECTION REQUEST" at all the transmission timings for the regular data not involving the user operation in the multiple applications #1 to #N within the predetermined period.

The radio access network may be configured to notify of the predetermined period and the predetermined timing by way of broadcast information, a NAS (Non-Access Stratum) signal, and the like.

Meanwhile, the transmission unit 13 may be configured to adjust the transmission timing for the "SIGNALLING CONNECTION RELEASE INDICATION" based on the timing of detection that there is no more data to be transmitted in the multiple applications #1 to #N.

For example, the transmission unit 13 may be configured to transmit one "SIGNALLING CONNECTION RELEASE INDICATION" at a predetermined timing within a predetermined period instead of transmitting the "SIGNALLING CONNECTION RELEASE INDICATION" at all the timings of detection in the multiple applications #1 to #N.

The radio access network (such as the radio base station eNB) may be configured to notify of the predetermined period and the predetermined timing by way of the broadcast information, a paging signal, the NAS signal, and the like.

According to the invention of the embodiment, when the multiple applications #1 to #N are operated independently, it is possible to avoid a situation where the "RRC CONNECTION REQUEST" and the "SIGNALLING CONNECTION RELEASE INDICATION" are transmitted at transmission occasions of the "RRC CONNECTION REQUEST" and the "SIGNALLING CONNECTION RELEASE INDICATION" in the multiple applications #1 to #N, and thus to suppress an increase in signal quantity attributed to repetition of the transition of the mobile station UE to the "Preservation state" and the return of the mobile station UE to the "Active state."

The features of the above-described embodiment may also be expressed as follows.

A first feature of this embodiment is summarized as a mobile station UE including: multiple application processing units 11#1 to 11#N configured to perform processing for multiple applications #1 to #N, respectively; a management unit 12 configured to manage a transmission timing for regular data not involving a user operation in each of the multiple applications #1 to #N; and a transmission unit 13 configured to transmit an "RRC CONNECTION REQUEST (a connection request signal)" to the radio access network (for example, the radio base station eNB) when the mobile station UE transitions from a "Preservation state" to an "Active state." Here, the transmission unit 13 is configured to adjust a transmission timing for the "RRC CONNEC- TION REQUEST" based on the transmission timings for the regular data not involving the user operation in the multiple applications #1 to #N.

In the first feature of this embodiment, the transmission unit 13 is configured to send the radio access network (for example, the radio base station eNB) a "SIGNALLING CONNECTION RELEASE INDICATION (a release indication signal)" commanding release of a signalling connection in a case of detection that there is no more data to be transmitted, and the transmission unit 13 is configured to adjust a transmission timing for the "SIGNALLING CONNECTION RELEASE INDICATION" based on timings of the detection in the multiple applications.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-057393 (filed on Mar. 14, 2012) is incorporated by reference in the present specification.

INDUSTRIAL APPLICABILITY

As described above, according to the present invention, it is possible to provide a mobile station capable of suppressing an increase in signal quantity attributed to repetition of transition to a "Preservation state" and return to an "Active state" when multiple applications are operated independently.

EXPLANATION OF THE REFERENCE NUMERALS

UE mobile station
eNB radio base station
11#1 to 11#N application processing unit
12 management unit
13 transmission unit
14 reception unit

The invention claimed is:

1. A mobile station comprising:
a plurality of application processing unit that performs processing for a plurality of applications, respectively;
a management unit that manages a transmission timing of a periodic data which does not involve a user operation in each of the plurality of applications; and
a transmission unit that transmits a connection request signal to a radio access network when the mobile station transitions from a "Preservation state" to an "Active state," wherein
the transmission unit adjusts a transmission timing for the connection request signal based on the transmission timings of the periodic data which does not involve the user operation in the plurality of applications.

2. The mobile station according to claim 1, wherein
the transmission unit sends the radio access network a release indication signal commanding release of a signaling connection in a case of detection that there is no more data to be transmitted, and
the transmission unit adjusts a transmission timing for the release indication signal based on timings of the detection in the plurality of applications.

3. The mobile station according to claim 1, wherein
the transmission unit adjusts a transmission timing for the connection request signal at a predetermined timing within a predetermined period based on the transmission timings of the periodic data which does not involve the user operation in the plurality of applications.

* * * * *